United States Patent [19]

Terada

[11] 4,420,235

[45] Dec. 13, 1983

[54] SHUTTER DRIVE SAFETY DEVICE FOR A CAMERA

[75] Inventor: Katumi Terada, Hachioji, Japan

[73] Assignee: Olympus Optical Company Ltd., Japan

[21] Appl. No.: 347,569

[22] Filed: Feb. 10, 1982

[30] Foreign Application Priority Data

Apr. 23, 1981 [JP] Japan .................... 56-59552

[51] Int. Cl.³ .................... G03B 9/34; G03B 17/38
[52] U.S. Cl. .................... 354/266; 354/244; 354/234.1
[58] Field of Search .............. 354/234, 241, 242, 243, 354/244, 266, 268

[56] References Cited

U.S. PATENT DOCUMENTS

3,913,117 10/1975 Endo et al. .................... 354/242
4,096,503 6/1978 Sato .................... 354/268
4,215,925 8/1980 Date et al. .................... 354/234

*Primary Examiner*—A. A. Mathews
*Attorney, Agent, or Firm*—Ostrolenk, Faber, Gerb & Soffen

[57] ABSTRACT

A safety device is provided for a shutter drive mechanism for camera in which a shutter opening member and a shutter closing member are independently operable, with an exposure period controlled by a time interval between times of initiation of operation of the both members. The safety device includes a constraining member which locks a detent member which controls the operation of the shutter closing member in response to a film winding operation and which unlocks the detent member in response to a shutter release operation.

18 Claims, 3 Drawing Figures

SHUTTER DRIVE SAFETY DEVICE FOR A CAMERA

BACKGROUND OF THE INVENTION

The invention relates to a shutter drive safety device for a camera, and more particularly, to a drive safety device for a shutter of the type including a shutter opening member and a shutter closing member, each of which is independently operable so that an exposure period is controlled by a time interval between the times of initiation of operation of both the members.

As is well recognized, a shutter of the kind described for a camera is utilized as a focal plane shutter, a lens shutter of two ring type including a shutter opening ring and a shutter closing ring, a shutter of guillotine type including a pair of blades and the like. A focal plane shutter is most frequently used in a single lens reflex camera.

Figure 1:
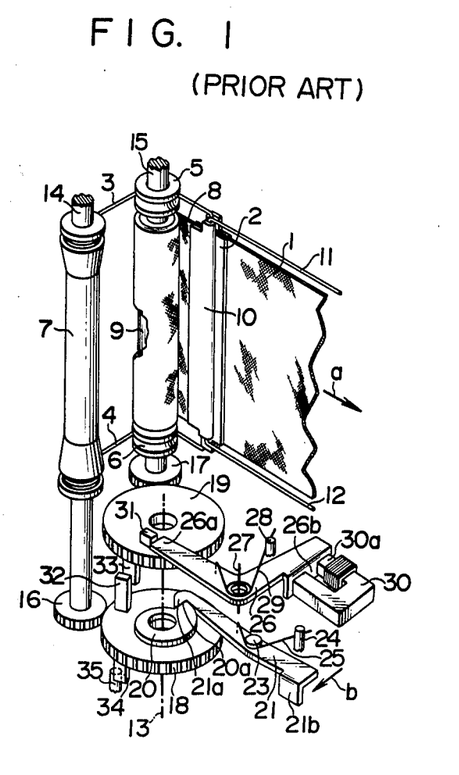
FIG. 1 is a perspective view of parts of one form of a drive control mechanism for focal plane shutter which may be used in a single lens reflex camera.

Referring to FIG. 1 for describing one form of a drive control mechanism used with a focal plane shutter which may be used in a single lens reflex camera, it is to be understood that parts other than the drive control mechanism are omitted from illustration. In this Figure, a first blind 1, which represents a shutter opening member, has its right-hand edge disposed around a first blind take-up drum (not shown) while its left-hand edge has an end piece 2 fixedly connected thereto for defining a slit which is used for the purpose of exposure. A pair of first blind pulling strings 3, 4 have their one end anchored to the upper and the lower end of the end piece 2, and extend around a pair of guide pulleys 5, 6 to be wound around the upper and the lower end of a first blind winding drum 7. The pulleys 5, 6 are rotatably fitted on the upper and the lower end of a support shaft 15 associated with a second blind winding drum 9.

A second blind 8, which represents a shutter closing member, has its left-hand portion disposed around the second blind winding drum 9 while its right-hand edge has an end piece 10 secured thereto for defining a slit which is used for the purpose of exposure. A pair of second blind pulling strings 11, 12 have their one end anchored to the upper and the lower end of the end piece 10, and have their other end extending around guide pulleys, not shown, to be disposed around a second blind take-up drum. While not shown, the first blind take-up drum and the second blind take-up drum are urged by shutter charging springs, in the form of strong coiled springs which are internally received therein, in a direction indicated by an arrow a, which represents the shutter blind take-up direction during a film winding operation, all in a manner well known in the art. Both winding drums 7, 9 are fixedly mounted on support shafts 14, 15, respectively, which are rotatably disposed. A first blind pinion 16 and a second blind pinion 17 are integrally mounted on the lower portion of the shafts 14, 15, respectively.

The pinions 16, 17 are in meshing engagement with a first blind winding gear 18 and a second blind winding gear 19, respectively. These gears have substantially similar configuration and diameter, and are rotatably mounted on a common support shaft 13. These gears rotate through one revolution in response to a winding operation of a shutter blind winding shaft, not shown, which rotates during a film winding operation. In this manner, these gears cause both pinions 16, 17 to rotate, thus causing a rotation of the winding drums 7, 9 to wind up the first shutter blind 1 and the second shutter blind 8, respectively. A cam plate 20 is integrally secured to the top surface of the gear 18, and includes a step 20a which operates to prevent a rotation of the gear 18 in the reverse direction as the latter has been rotated through a given angle.

The step 20a in the cam plate 20 is engaged by a hook 21a formed on one end of a first blind detent lever 21 which is pivotally mounted on a pin 23, secured to a stationary member, substantially centrally along its length. The other end of the detent lever 21 is formed with a folded piece 21b which depends downwardly from the lateral edge. A torsion spring 25 is disposed on the pin 23 and has its one end engaged with a lateral edge of the lever 21 toward the hook 21a and its other end engaged with an anchorage pin 24, thus urging the lever 21 to rotate counter-clockwise. However, the resulting rotation is limited by the abutment of the hook 21a against the peripheral edge of the cam plate 20.

A peg 31 is fixedly mounted on the top surface of the gear 19 adjacent to the periphery thereof for engagement by a locking end 26a of a second blind detent lever 26 at the termination of a second blind winding operation, thus preventing a reverse rotation of the gear 19. This winding operation takes place by a rotation of the gear 19 through a given angle. The detent lever 26 is L-shaped, and its bend is pivotally mounted on a pin 27. The other end of the lever 26 is formed with a folded piece 26b which depends downwardly in a direction perpendicular thereto from the lateral edge thereof. A release electromagnet 30 has its armature 30a disposed in opposing relationship with the folded piece 26b. A torsion spring 29 is disposed on the pin 27 and has its one end engaged with one arm of the lever 26 and its other end engaged with an anchorage pin 28, thus urging the lever 26 to rotate counter-clockwise about the pin 27. However, the folded piece 26b is normally held attracted by the armature 30a of the electromagnet 30, thus suppressing the rotation of the lever. An upright lug 32 is fixedly mounted on the top surface of the gear 18 adjacent to its periphery for engagement with another lug 33 fixedly mounted on the bottom surface of the gear 19 adjacent to its periphery and depending downwardly therefrom. During a film winding operation, the lugs 32, 33 engage with each other to connect both the winding gears 18, 19 integrally. Another lug 34 is fixedly mounted on the bottom surface of the gear 18 adjacent to its periphery and depends downwardly therefrom. During the operation of the first blind 1 or the shutter, the lug 34 is adapted to abut against a stop pin 35, fixedly mounted on a stationary member, thus ceasing the rotation of the gear 18 after it has rotated counter-clockwise through substantially one revolution.

In operation, FIG. 1 illustrates a shutter charged condition when the first and the second blind 1, 8 have been wound up. Specifically, the both gears 18, 19 have clockwise rotated through one revolution, respectively, in response to the operation of a film winding mechanism, not shown. As a result, both the pinions 16, 17 have caused both the drums 7, 9 to rotate counter-clockwise, and both the gears 18, 19 are maintained in locked condition by the respective detent levers 21, 26 even though the drums are urged in a direction indicated by the arrow a, thus achieving a shutter charged condition.

Subsequently, as the folded piece 21b is pushed in a direction indicated by an arrow b in response to the depression of a shutter release button, not shown, the lever 21 rotates clockwise about the pin 23, whereby the hook 21a is disengaged from the step 20a on the cam plate 20. Thereupon, the first blind winding gear 18 which is integral with the cam plate 20 is allowed to rotate counter-clockwise rapidly under the resilience of the charging spring, thus causing the first blind 1 to run in the direction of the arrow a at a high rate. When the winding gear 18 has rotated through substantially one revolution until lug 34 abuts against the stop pin 35, it ceases to rotate. On the other hand, the second blind winding gear 19 is prevented from rotating since the peg 31 abuts against the locking end 26a of the detent lever 26 at the time the first blind winding gear 18 begins its rotation, thus preventing the second blind 8 from running while the first blind 1 is allowed to run alone.

At the same time as the shutter release occurs, a movable reflecting mirror (not shown) moves upward to initiate an exposure process, whereby light reflected from the first blind and the film surface (not shown) impinges upon a light receiving element, not shown, for the purpose of photometry. When a proper amount of light has been received, an exposure control circuit produces an output which deenergizes the electromagnet 30. Thereupon, the armature 30a is no longer able to hold the folded piece 26b attracted thereto, whereby the second blind detent lever 26 is allowed to rotate counter-clockwise under the bias applied thereto. Consequently, the locking end 26a is disengaged from the peg 31, allowing the second blind winding gear 19 to rotate rapidly counter-clockwise under the resilience of the charging spring to thereby allow the second blind 8 to run. When the gear 19 rotates through substantially one revolution the lug 33 thereon abuts against the lug 32 on the first blind winding gear 18 which remains at rest after having completed its rotation through substantially one revolution. In this manner, the gear 19 ceases to rotate, thus terminating the running of the second blind 8. In the manner mentioned above, the first blind 1 and the second blind 8 begin their running with a time interval therebetween which is controlled by an exposure control circuit to thereby open and close an exposure light path. Light from an object being photographed which passes through a taking lens reaches a film surface, thus allowing the image of the object to be formed on the film surface with a proper amount of light.

After the completion of a photographing operation, a film winding operation causes both the first blind 1 and the second blind 8 to be wound up on their winding drums, thus achieving a shutter charged condition. During such winding operation, the end pieces 2, 10 on the both blinds 1, 8 are maintained in overlapping relationship, as shown, in order to prevent a leakage of light through a clearance formed between the blinds 1, 8. The blinds are maintained in their wound position by respective detent levers 21, 26 while maintaining such overlapping relationship. The arrangement is now ready to initiate another shutter operation.

In the operation of the shutter drive control mechanism mentioned above, it will be seen that for an exposure period less than 1/1000 second, there will be a very short time interval from the unlocking of the first blind winding gear 18 from the detent lever 21 to the unlocking of the second blind winding gear 19 from the detent lever 26. For this reason, it is necessary that the unlocking of the gear 19 from the detent lever 26 be achieved in a smooth manner. However, the adjustment is very troublesome, and the arrangement is liable to cause an inproper operation of the exposure function because of the unsmooth operation. Also, while the arrangement may operate smoothly under normal temperatures, the operation may be rendered unsmooth under reduced temperatures. An added difficulty is experienced if it is attempted to assure a smooth operation under all temperatures. If the resilience of the spring 29 is increased in an attempt to facilitate the disengagement of the detent lever 26 from the peg 31 on the gear 19, oscillations and shocks occurring during a transportation of a camera or other factors may readily cause the disengagement, allowing the both blinds 1, 8 to begin running simultaneously independently from the functioning of an exposure control circuit, resulting in a failure to take a picture.

SUMMARY OF THE INVENTION

In view of the foregoing, it is an object of the invention to provide a shutter drive safety device for camera which includes a constraining member which constrains or locks the operation of a detent member that is operative to control a shutter closing member and which unlocks the detent member prior to the initiation of operation of a shutter opening member in response to a shutter release operation.

In accordance with the invention, the provision of a constraining member which responds to a film winding operation allows a detent member which controls a shutter closing member to be constructed in a manner to facilitate a movement of the latter so as to allow a high speed shutter operation, without accompanying any unintended movement of such detent member until immediately before the initiation of operation of a shutter opening member. In this manner, the detent member associated with the shutter closing member is prevented from being readily disengaged in response to oscillations or shocks which may be produced during a transportation of a camera. Also, a shutter release operation unlocks the detent member from the restraining member, thus allowing a high speed shutter operation without any difficulty. An accurate initiation of running of the shutter closing member is assured under reduced temperatures as well as under normal temperatures. Difficulties experienced in the prior art if a rapid movement of the detent member associated with the shutter closing member is allowed are eliminated in a sophisticated manner.

DESCRIPTION OF PREFERRED EMBODIMENTS

Figure 2:
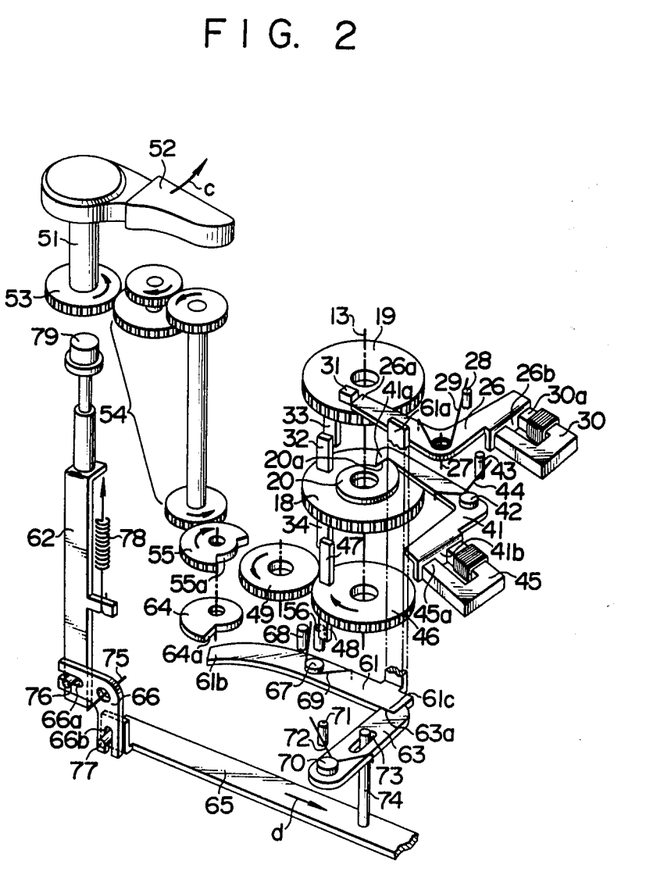
FIG. 2 is a perspective view of a shutter drive safety device for camera according to one embodiment of the invention.

Referring to FIG. 2, there is shown a shutter drive safety device for camera according to one embodiment of the invention, in perspective view. In this embodiment, a drive control mechanism for focal plane shutter includes a first blind winding gear, a second winding gear and associated components which are arranged and constructed in a manner substantially similar to those illustrated in FIG. 1, and hence these members will not be described while using the same reference numerals or characters as before. However, there is a sole difference in the present embodiment in that a first blind detent lever 41 which operates to lock the first blind winding gear 18 is locked or released by a release electromagnet 45 rather than by the first blind detent lever 21 as in the arrangement of FIG. 1. The configuration and operation of the first blind detent lever 41 remains substantially the same as the second blind detent lever 26 illustrated in FIG. 1, the sole difference being that the lever 41 is solenoid operated in contrast to a mechanical operation of the detent lever 21 shown in FIG. 1. Specifically, the first blind detent lever 41 has an inverted L-configuration and is pivotally mounted on a pin 42 at its bend. A hook 41a formed on one end of the lever is adapted to engage with or disengage from the step 20a formed on the cam plate 20 which is integral with the first blind winding gear 18. A folded piece 41b which depends downwardly from the lateral edge toward the other end of the lever is disposed in opposing relationship with an armature 45a of the release electromagnet 45. A torsion spring 44 is disposed on the pin 42 and has its one end engaged with a lateral edge toward the hook 41a and its other end engaged with an anchorage pin 43, thus urging the lever 41 to rotate clockwise. However, the resulting rotation is limited by the folded piece 41b which is held attracted to the armature 45a of the release electromagnet 45. Under this condition, the hook 41a is engaged with the step 20a on the cam plate 20.

A drive mechanism which drives a first blind and a second blind winding gear 18, 19 during a winding (shutter charging) operation has a conventional construction, and is operated in conjunction with a film winding operation. Specifically, as a film winding lever 52 is turned through substantially 180° in a direction indicated by an arrow c, the turning motion is transmitted to cause a rotation of a drive gear 46 through substantially one revolution, through a drive train including a winding shaft 51 on which the winding lever 52 is mounted, a gear 52 fixedly mounted on the winding shaft, an intermediate coupling gear train 54, a gear 55 with a hiatus 55a, and an intermediate gear 49. The rotation of the drive gear 46 causes the first blinding gear 18 to rotate. It is to be noted that the gear 55 having a hiatus 55a is adapted to rotate through one revolution for each operation of the winding lever 52, thus causing the intermediate gear 49 to rotate through one revolution. When the gear 55 comes to a stop, the hiatus 55a comes opposite to the intermediate gear 49, as shown, removing any meshing engagement therebetween. Under this condition, the intermediate gear 49 is free to rotate. As a result of rotation of the intermediate gear 49 through one revolution, the drive gear 46 also rotates through substantially one revolution. It will be seen that the drive gear 46 is located below the first blind winding gear 18, and is rotatably mounted on a support shaft 13 associated with the first blind and the second blind winding gear 18, 19 in coaxial relationship therewith. A lug 47 is fixedly mounted on the top surface of the drive gear 46 adjacent to the periphery so as to be located opposite to a lug 34 on the winding gear 18. Consequently, as the drive gear 46 rotates clockwise through one revolution, the lug 47 drives the lug 34 to cause the winding gear 18 to rotate in the same direction through one revolution. A locking lug 48 is fixedly mounted on the bottom surface of the drive gear 46 toward the periphery thereof and extends downwardly for abutment against a fixed pin 56 as the drive gear 46 is driven counter-clockwise through the lug 34 by a rapid rotation of the winding gear 18 in the counter-clockwise direction which occurs when it is released, thus terminating the rotation of the drive gear 46 after it has rotated through one revolution.

A shutter drive safety device of the invention may be used in a camera which is provided with a winding mechanism and a shutter drive mechanism as mentioned above. Specifically, the safety device essentially comprises a constraining member 61 which is operative in response to a film winding operation to block a movement of the second blind detent lever 26 in a direction to release the latter, a release member 63 operative to the depression of a shutter release member 62 to disable the constraining member 61 to unlock the detent lever 26 before the first blind winding gear 18 initiates its shutter operation, and a cam plate 64 for moving the constraining member 61 to its constraining position in response to a turning motion of the film winding lever 52.

As shown, the constraining member 61 is in the form of a horizontally elongate strip-like lever which is centrally pivotally mounted on a pin 67. An upright extension 61a extends upwardly from a lateral edge thereof adjacent to its right-hand end, at right angles to the plane of the lever while the left-hand end is slightly curved to provide an element 61b which cooperates with a step 64b formed on the cam plate 64. A torsion spring 69 is disposed on the pin 67 and has its one end engaged with a lateral edge toward the upright extension 61a and its other end engaged with an anchorage pin 68, thus urging the constraining member to rotate clockwise. However, the resulting rotation is limited by the engagement of its right-hand end with a step 63a formed in the free end of the release member 63 when a film winding operation has been completed, as shown, and is also limited by the abutment of the element 61b against the step 64a of the cam plate 64 during a shutter release operation. Toward its free end, the rear side of the upright extension 61a bears against one lateral edge of the second blind detent lever 26 in a region toward the locking end 26a when the first blind 1 and the second blind 8 (see FIG. 1) have been wound up as shown, thus constraining a movement of the second blind detent lever 26 so as to pevent a disengagement of the locking end 26a from the peg 31 on the second blind winding gear 19 which would allow the second blind winding gear 19 to rotate if the lever 26 tends to rotate counter-clockwise upon occurrence of oscillations or shocks applied to the camera.

The release member 63 is in the form of a horizontally elongate strip forming a rocking arm, which has its one end pivotally mounted on a pin 70. The step 63a is formed in the free end thereof as a notch having faces which adapted to bear against the right-hand end face of the constraining member 61 and against the lateral edge of the member 61 which is located opposite from the lateral edge from which the upright extension 61a extends. A torsion spring 72 is disposed on the pin 70 and has its one end engaged with its right-hand edge and its other end engaged with an anchorage pin 71, thus urging the release member 63 to rotate counter-clockwise about the pin 70. However, under the shutter charged condition as shown, the resulting rotation is limited by the engagement of the right-hand end 61c of the constraining member 61 with the step 63a. Intermediate its length, the release member 63 is formed with an elongate slot 73, into which is fitted an engaging pin 74 which is in turn fixedly mounted on a horizontally elongate shutter operating member 65 toward its right end. The shutter operating member 65 is adapted to move to the left and right in response to a vertical movement of a shutter release member 62, which movement is transmitted through a coupling member 66.

The coupling member 66 is formed as a lever having an inverted L-configuration which is pivotally mounted on a pin 65 at its bend. Both arm ends are formed with forks 66a, 66b, which are engaged by a pin 76 fixedly mounted on the lower end of the release member 62 and a pin 77 fixedly mounted on the left-hand end of the operating member 65. In this manner, a vertical movement of the release member 62 causes the coupling member 66 to move the shutter operating member 65 to the left and right.

The cam plate 64 is disposed below the gear 55 having the hiatus, and is arranged in coaxial relationship therewith for integral rotation therewith. Under the shutter charged condition as shown, the step 64a of the cam plate 64 is removed from and does not engage with the element 61b of the constraining member 61. When the constraining member 61 rotates clockwise, the element 61b engages the step 64a, and each clockwise rotation of the cam plate 64 through one revolution in response to a film winding operation allows its peripheral edge to drive the lateral edge of the constraining member 61 adjacent to the element 61b, thus returning it to the condition shown. The release member 62 is well known in the art, and is disposed in a camera (not shown) so as to be movable in the vertical direction. It carries a pushbutton 79 which is located to project above the top surface of the camera and which can be depressed against the resilience of a coiled spring 78 to trigger a shutter operation through the operating member 65.

In operation, FIG. 2 illustrates a shutter charged condition which is achieved by winding the first blind 1 and the second blind 8 (see FIG. 1) around the first blind and the second blind winding drum 7, 9 (see FIG. 1), which are driven by the respective winding gears 18, 19, respectively, against a strong resilience applied to the respective take-up drums, not shown. Under this condition, the first blind and the second blind winding gear 18, 19 are prevented from rotating in the take-up direction by means of the respective detent levers 41, 26. When the pushbutton 79 is depressed under this condition, the shutter operating member 65 moves in a direction indicated by an arrow d, closing a switch, not shown, to deenergize the electromagnet 45, whereupon the attraction applied to the folded piece 41b of the detent lever 41 by the armature 45a is terminated. Thereupon, the detent lever 41 is able to rotate clockwise under the bias applied thereto, disengaging the hook 41a from the step 20a of the cam plate 20, thus allowing the first blind winding gear 18 to rotate rapidly counter-clockwise under the resilience of the charging spring (not shown) which is contained in the associated take-up drum to cause a running of the first blind 1 as it is being taken up on the take-up drum. Simultaneously, the movement of the operating member 65 in the direction of the arrow d causes the engaging pin 74 fixedly mounted thereon to move in the same direction, whereby the engagement between the pin 74 and the slot 73 causes the release member 63 to rotate clockwise, disengaging the step 63a from the right-hand end 61c to allow a clockwise rotation of the constraining member 61 under the bias applied by the spring 69 until the element 61b abuts against the step 64a of the cam plate 64. A clockwise rotation of the constraining member 61 allows the free end of the upright extension 61a to rotate in the same direction, whereby the second blind detent lever 26 is unlocked to be rotatable in the counter-clockwise direction. Thus, depending on the condition of the solenoid 30, the lever 26 rotates counter-clockwise, disengaging the locking end 26a from the peg 31 on the second blind winding gear 19, whereupon the gear 19 rapidly rotates counter-clockwise under the resilience of the charging spring (not shown) contained within its associated take-up drum, allowing the second blind 8 to run while it is being taken up on the second blind take-up drum (not shown). A shutter release operation takes place in this manner. It is to be noted that the second blind 8 is positively constrained from running before the initiation of running of the first blind 1, and is unlocked to run at the same time as the initiation of running of the first blind. Therefore, no difficulty is experienced in normal shutter operations, completely preventing any difficulty that oscillations or shocks applied to the camera may cause running of the both blinds while they are in overlapping relationship to thereby disable a photographing operation.

Figure 3:
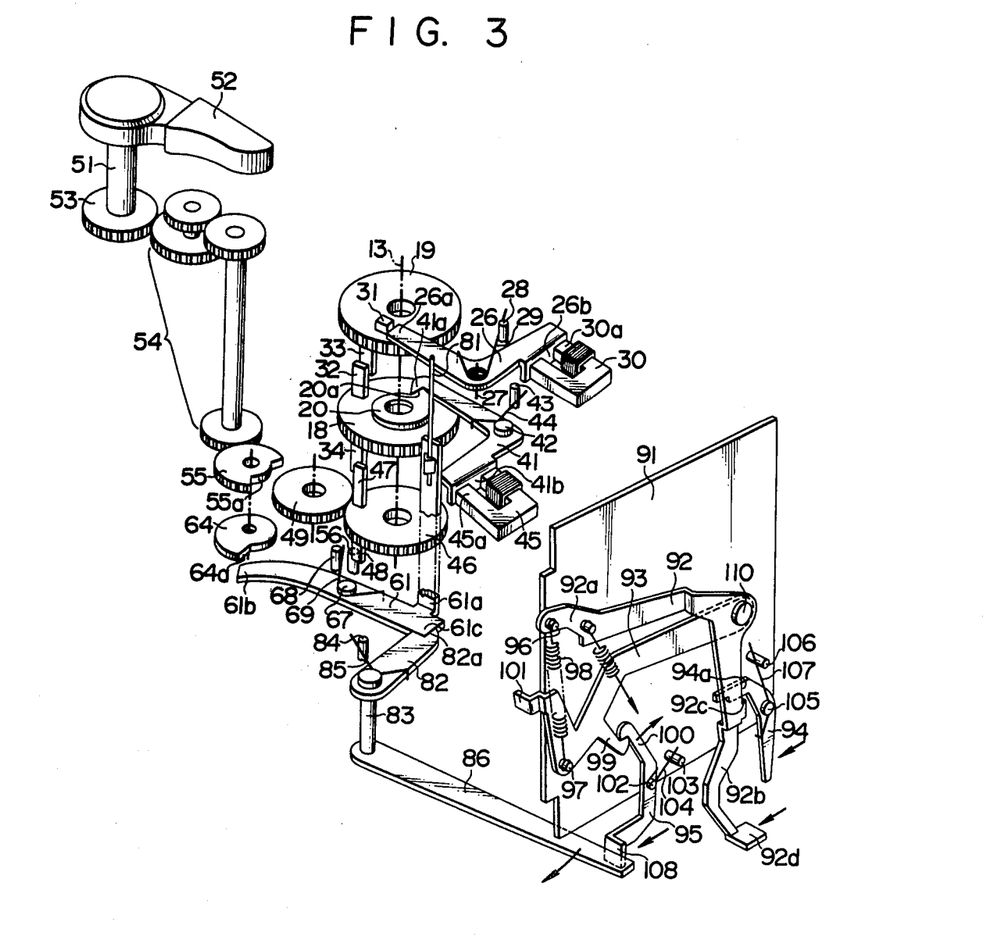
FIG. 3 is a perspective view of a shutter drive safety device for camera according to another embodiment of the invention.

FIG. 3 is a perspective view of a shutter drive safety device according to another embodiment of the invention. This embodiment differs from the embodiment of FIG. 2 only in that a diaphragm control mechanism of a single lens reflex camera is utilized and that a resilient rod 81 is mounted on the free end of the upright extension 61a of the constraining member 61 so as to constrain a movement of the second blind detent lever 26. In other respects, the arrangement is similar to that shown in FIG. 2, and hence corresponding parts are designated by like numerals without repeating their description. A shutter drive mechanism utilized in the present embodiment remains the same as that shown in FIG. 2 in function, but the release member is associated with a diaphragm drive mechanism which is in turn interlocked with the shutter drive mechanism. The diaphragm drive mechanism used in the present embodiment is conventional in construction, and is mounted on the outside of a sidewall 91 of a mirror box in which a movable reflecting mirror of the camera, not shown, is disposed.

To simplify the description, a mechanism which is utilized to operate the movable reflecting mirror is omitted from illustration. In FIG. 3, numeral 92 represents a charging lever, 93 a diaphragm drive arm, 94 a detent lever associated with the charging mirror 92, and 95 a detent lever associated with the diaphragm drive arm 93. The charging lever 92 includes a horizontal arm 92a and a vertical arm 93b, and is pivotally mounted on a pin 110 at its bend. The lower end of the vertical arm 92b is formed with a tab 92d, which may be driven in a direction indicated by an arrow in response to a film winding operation, thus turning the lever 92 clockwise to thereby charge a coiled tension spring 98 extending between a pin 96 fixedly mounted on the free end of the horizontal arm 92a and a pin 97 fixedly mounted on the free end of the diaphragm drive arm 93. It is to be understood that the spring 98 is adapted to store an increased magnitude of resilience. The resilience of the spring is maintained until the end of a photographing operation by the action of the detent lever 94. The diaphragm drive arm 93 has its one end pivotally mounted on the pin 110 and includes a horizontal arm which is contiguous with a pair of downwardly extending V-shaped arms, one of which is formed with a hook 99 extending backward and adapted to engage a hook 110 formed on one end of the detent lever 95, thus preventing the lever 93 from rotating while storing a resilience in the coiled spring 98 which enables a clockwise rotation. The pin 97 is fixedly mounted at the apex of the other V-shaped arm. The free end of the V-shaped arm is formed as a diaphragm drive 101. The detent lever 95 has an approximately channel configuration, the vertical limb of which is pivotally mounted on a pin 102. A torsion spring 104 is disposed on the pin 102 and its one end engaged with the lateral edge of the upper limb and its other end engaged with an anchorage pin 103, thus urging the lever 95 to rotate counter-clockwise. This bias is effective to cause the hook 100 to engage with the hook 99 on the diaphragm drive arm 93, thus locking it as shown when the charging lever 92 is charged as shown. The detent lever 94 is in the form of an elongate strip having an inverted L-configuration, and is pivotally mounted on a pin 105 at its bend. A torsion spring 107 is disposed on the pin 105 and has its one end engaged with the lateral edge of the vertical arm thereof and its other end engaged with an anchorage pin 106, thus urging the lever 94 to rotate counter-clockwise. This bias is effective to cause a projection 92c, formed as a folded piece extending into the plane of the drawing from a lateral edge of the vertical arm 92b of the lever 92 intermediate its length, to engage a locking arm 94a formed by the free end of the horizontal arm of the detent lever 94 whenever the charging lever 92 has rotated clockwise to be charged, thus preventing the charging lever 92 from rotating counter-clockwise under the stored resilience of the spring 98. When a photographing operation is terminated by the running of the second blind, the lower end of the detent lever 94 is driven in the direction of an arrow indicated against the resilience of the torsion spring 107, thus unlocking the charging lever 92. Thereupon the charging lever 92 rotates counter-clockwise under the resilience of the coiled spring 98, assuming its uncharged condition. The lower end of the detent lever 95 is formed with an extension 108 which is folded to extend outwardly. In response to the depression of the pushbutton 79 (see FIG. 2), the extension 108 is driven in the direction of an arrow indicated to cause the detent lever 95 to rotate clockwise against the resilience of the torsion spring 104, thus terminating the engagement between the hooks 100, 99 to allow a clockwise rotation of the diaphragm drive arm 93. A clockwise rotation of the diaphragm drive arm 93 is effective to establish a diaphragm aperture within a lens barrel.

In the present embodiment, a release member 82 which corresponds to the release member 63 of FIG. 2 is constructed as a horizontally elongate strip-shaped arm, which has its one end fixedly mounted on the top end of a pin 83 which is in turn rotatably mounted within the camera. The free end of the release member 82 is formed with a step 82a, which is similar to the step 63a formed in the release member 63 of FIG. 2. A torsion spring 85 is disposed on the pin 63 and has its one end engaged with a lateral edge of the release member 82 toward its free end and its other end engaged with an anchorage pin 84, thereby urging the release member 82 to rotate counter-clockwise. However, the resulting rotation is limited by the abutment of the step 82a against the end 61c of the constraining member 61. At its one end, a connecting member 86 in the form of a horizontally elongate strip extending in a direction substantially perpendicular to the release member 82 is fixedly connected with the lower end of the pin 83. The other end of the connecting member 86 is located opposite to the extension 108 of the detent lever 95 associated with the diaphragm drive arm 93, and as the extension 108 is driven in a direction of the arrow in response to the depression of the shutter release button 79, the connecting member 86 rotates clockwise about the pin 83, causing also the release member 82 to rotate clockwise in integral manner, thus permitting the constraining member 61 to rotate clockwise by terminating the engagement between the step 82a and the end 61c.

It is to be understood that the operation of the arrangement is quite similar to that of FIG. 2 even though a different release mechanism is used for the constraining member 61. Specifically, the depression of the shutter button to trigger a shutter release operation causes the detent lever 95 to be driven in a direction of the arrow through an interlocking mechanism, not shown, whereby the hook 100 is disengaged from the hook 99 on the diaphragm drive arm 93, allowing the diaphragm drive arm 93 to begin establishing a diaphragm aperture. As the detent lever 95 moves in the direction of the arrow, the extension 108 drives the connecting member 86, whereby the release member 82 rotates clockwise about the pin 83 against the bias applied by the spring 85. Consequently, the step 82a is disengaged from the end 61c of the constraining member 61, which therefore rotates clockwise about the pin 67, terminating the constraint applied by the resilient pin 81 upon the detent lever 26.

In the present embodiment, the detent lever 26 is constrained by the resilient pin 81 which is integrally mounted on the free end of the upright extension 61a of the constraining member 61. This brings forth an advantage that an adjustment of the location where the upright extension 61 bears against the detent lever 26 is unnecessary.

While in the described embodiments, the invention has been applied to a focal plane shutter, it should be understood that the invention is not limited thereto, but is equally applicable to a lens shutter having two rings for including an opening and a closing ring, or a shutter of guillotine type including a pair of blades.

What is claimed is:

1. A shutter drive safety device for a camera, comprising:

a first drive mechanism associated with a shutter opening member and including a first detent member which controls the operation of the shutter opening member, said first detent member moving between a first position wherein it engages and restrains said shutter opening member, and a second position wherein it disengages and frees said shutter opening member such that said shutter opening member is free to open said shutter;

a second drive mechanism associated with a shutter closing member and including a second detent member which controls the operation of the shutter closing member, said second detent member moving between a first position wherein it engages and restrains said shutter closing member, and a second position wherein it disengages and frees said shutter closing member such that said shutter closing member is free to close said shutter, said second detent member, when it is in its first position, being the only element which engages and restrains said shutter closing member;

a constraining member operative in response to a film winding operation to maintain said second detent member in its said first position; and a release member operative in response to a shutter release operation to unlock said second detent member from constraint by said constraining member before said shutter opening member begins to operate.

2. A shutter drive safety device according to claim 1 in which the constraining member is in the form of a lever having a constraining portion which is engageable with and disengageable from said second detent member, and further including a cam member which rotates through one revolution in interlocked relationship with a film winding mechanism, the cam member being adapted to rock the lever so that the constraining portion is displaced to a position where it constrains the operation of said second detent member.

3. A shutter drive safety device according to claim 2 in which the constraining portion comprises a resilient pin.

4. A shutter drive safety device according to claim 1 in which the release member is in the form of a rocking arm which is urged for engagement with the constraining member and including a detent portion which is operable to maintain the constraining member locked whenever the release member has engaged the constraining member.

5. A shutter drive safety device according to claim 4 in which the detent portion is defined by a notch which is adapted to engage one end of the constraining member.

6. A shutter drive safety device according to claim 4 in which the release member is rocked by a shutter operating member which is displaced in response to the depression of a shutter release member, thereby terminating the engagement with the constraining member to unlock the latter.

7. A shutter drive safety device according to claim 4, further including a detent lever associated with a diaphragm drive arm, and a connecting member which is interlocked with a movement of the detent lever to unlock the diaphragm drive arm, the release member being rocked by the connecting member in response to a shutter release operation, thereby terminating the engagement with the constraining member to unlock it.

8. A shutter drive safety device for a camera, comprising:

a first drive mechanism associated with a shutter opening member and including a first detent member which controls the operation of said shutter opening member;

a second drive mechanism associated with a shutter closing member and including a second detent member which controls the operation of the shutter closing member;

a constraining member operative in response to a film winding operation to constrain a movement of said second detent member, said constraining member being in the form of a lever having a constraining portion which is engagable with and disengagable from said second detent member;

a cam member which rotates through one revolution in interlocked relationship with a film winding mechanism, the cam member being adapted to rock said lever so that said constraining portion is displaced to a position where it constrains the operation of said second detent member; and a release member operative in response to a shutter release operation to unlock said second detent member from constraint by the constraining member before the shutter opening member begins to operate.

9. A shutter drive safety device according to claim 8, in which the constraining portion comprises a resilient pin.

10. A shutter drive safety device for a camera, comprising:

a first drive mechanism associated with a shutter opening member and including a first detent member which controls the operation of said shutter opening member;

a second drive mechanism associated with a shutter closing member and including a second detent member which controls the operation of said shutter closing member;

a constraining member operative in response to a film winding operation so as to constrain movement of said second detent member;

a release member operative in response to a shutter release operation to unlock said second detent member from constraint by said constraining member before said shutter opening member begins to operate, said release member being in the form of a rocking arm which is urged for engagement with said constraining member and including a detent portion which is operable to maintain said constraining member locked whenever said release member has engaged said contraining member;

a detent lever associated with a diaphragm drive arm; and a connecting member which is interlocked with a movement of said detent lever to unlock said diaphragm drive arm, said release member being rocked by said connecting member in response to a shutter release operation, thereby terminating the engagement with said constraining member to unlock it.

11. A shutter drive safety device for a camera, comprising:

first drive means for opening a shutter of said camera;

a first detent member movable between a first position wherein it engages and constrains the operation of said first drive means and a second position wherein it disengages and frees the operation of said first drive means;

second drive means for closing said shutter of said camera;

a second detent member movable between a third position wherein it engages and constrains the operation of said second drive means and a fourth position wherein it disengages and frees the operation of said second drive means so as to initiate a shutter closing operation;

a constraining member movable between a fifth position in which said constraining member abuts said second detent member and maintains said second detent member in said third position and a sixth position in which said constraining member is disengaged from said second detent member and permits said second detent member to move into said fourth position;

interlocking means biasing said constraining member into said fifth position during a film winding operation of said camera, said interlocking means no longer biasing said constraining member upon the completion of said film winding operation of said camera; and a release member cooperating with said constraining member to restrain said second detent member in said third position prior to the initiation of a shutter release operation of said camera and to release said second detent member in response to said shutter release operation, said release member cooperating with said constraining member to release said second detent member before said first drive means is released by said first detent member.

12. A shutter drive safety device for a camera, comprising:

first drive means for opening a shutter of said camera;

a first detent member movable between a first position wherein it engages and constrains the operation of said first drive means and a second position wherein it disengages and frees the operation of said first drive means;

second drive means for closing a shutter of said camera;

a second detent member movable between a third position wherein it engages and constrains the operation of said second drive means and a fourth position wherein it disengages and frees the operation of said second drive means;

means for moving said second detent member into said fourth position to initiate a shutter closing operation;

a constraining member movable between a fifth position in which said constraining member abuts said second detent member and maintains said second detent member in said third position and a sixth position in which said constraining member is disengaged from said second detent member and permits said second detent member to move into said fourth position;

interlocking means biasing said constraining member into said fifth position during a film winding operation of said camera, said interlocking means no longer biasing said constraining member upon the completion of a film winding operation of said camera; and a release member cooperating with said constraining member to hold said second detent member in said third position prior to the initiation of a shutter release operation of said camera and to release said second detent member in response to said shutter release operation, said release member cooperating with said constraining member to release said second detent member before said means for moving said second detent member moves said second detent member into said fourth position to initiate said shutter closing operation.

13. A shutter drive safety device for a camera, comprising:

a shutter opening means for opening a shutter of said camera;

a shutter closing means for closing said shutter of said camera;

film winding means for winding a film and thereby enabling a film winding operation of said camera;

shutter opening drive means for actuating said shutter opening means and including a first detent member movable between a first position wherein it engages and constrains the operation of said shutter opening means and a second position wherein it disengages and frees the operation of said shutter opening means;

shutter closing drive means for actuating said shutter closing means and including a second detent member movable between a third position wherein it engages and constrains the operation of said shutter closing means and a fourth position wherein it disengages and frees the operation of said closing means;

a constraining member movable between a fifth position in which said constraining member abuts said second detent member and maintains said second detent member in said third position and a sixth position in which said constraining member is disengaged from said second detent member and permits said second detent member to move into said fourth position;

interlocking means biasing said constraining member into said fifth position in response to the winding of a film by said film winding means, said interlocking means no longer biasing said constraining member upon the completion of said film winding operation; and a release member cooperating with said constraining member to restrain said second detent member in said third position prior to the initiation of a shutter release operation of said camera and to release said second detent member in response to said shutter release operation, said release member cooperating with said constraining member to release said second detent member before said first drive means is released by said first detent member.

14. A shutter drive safety device for a camera, comprising:

a shutter opening means for opening a shutter of said camera;

a shutter closing means for closing said shutter of said camera;

film winding means for winding a film and thereby enabling a film winding operation of said camera;

shutter opening drive means for actuating said shutter opening means and including a first detent member movable between a first position wherein it engages and constrains the operation of said shutter opening means and a second position wherein it disengages and frees the operation of said shutter opening means;

shutter closing drive means for actuating said shutter closing means and including a second detent member movable between a third position wherein it engages and constrains the operation of said shutter closing means and a fourth position wherein it disengages and frees the operation of said closing means;

means for moving said second detent member into said fourth position to initiate a shutter closing operation;

a constraining member movable between a fifth position in which said constraining member abuts said second detent member and maintains said second detent member in said third position and a sixth position in which said constraining member is disengaged from said second detent member and permits said second detent member to move into said fourth position;

interlocking means biasing said constraining member into said fifth position in response to the winding of a film by said film winding means, said interlocking means no longer biasing said constraining member upon the completion of said film winding operation; and a release member cooperating with said constraining member to hold said second detent member in said third position prior to the initiation of a shutter release operation of said camera and to release said second detent member in response to said shutter release operation, said release member cooperating with said constraining member to release said second detent member before said means for moving said second detent member moves said second detent member into said fourth position to initiate said shutter closing operation.

15. A shutter drive safety device as claimed in any one of claims 11, 12, 13 or 14, wherein said interlocking means moves into contact with said constraining member and biases said constraining member into said fifth position during said film winding operation and moves away from said constraining member, so as to be out of contact with said constraining member, by the end of said film winding operation.

16. A shutter drive safety device as claimed in any one of claims 11, 12, 13 or 14, wherein said interlocking means comprises a spiral-shaped cam member which rotates through one revolution in association with the film winding operation.

17. A shutter drive safety device as claimed in any one of claims 11, 12, 13 or 14, wherein said release member is rotated by a connecting member in response to the movement of a detent lever to disengage said release member from said constraining member and thereby release said constraining member from said fifth position, said detent lever also enabling the operation of a diaphragm drive arm during said shutter release operation of said camera.

18. A shutter drive safety device for a camera in accordance with any one of claims 11, 12, 13 or 14, further comprising a diaphragm drive arm for operating a diaphragm of said camera when said diaphragm arm is moved from a seventh to an eighth position, a detent lever engaging said diaphragm arm, said detent lever being movable between a ninth position wherein it maintains said diaphragm arm in said seventh position and a tenth position wherein it permits said diaphragm arm to move into said eighth position, and a connecting member connected between said detent lever and said release member such that said release member is rotated by said connecting member and, in cooperation with said constraining member, releases said second detent member when said detent lever is moved into said eighth position.

* * * * *